(12) United States Patent  
Shibano et al.

(10) Patent No.: US 10,209,575 B2  
(45) Date of Patent: Feb. 19, 2019

(54) LIQUID CRYSTAL DISPLAY DEVICE

(71) Applicant: Japan Display Inc., Minato-ku (JP)

(72) Inventors: Fumihito Shibano, Minato-ku (JP); Hidemasa Yamaguchi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 193 days.

(21) Appl. No.: 15/160,411

(22) Filed: May 20, 2016

(65) Prior Publication Data

US 2016/0370618 A1    Dec. 22, 2016

(30) Foreign Application Priority Data

Jun. 17, 2015  (JP) .................................. 2015-121703

(51) Int. Cl.
| | | |
|---|---|---|
| *G02F 1/1339* | (2006.01) | |
| *G02F 1/1333* | (2006.01) | |
| *G02F 1/1362* | (2006.01) | |
| *G02F 1/1337* | (2006.01) | |

(52) U.S. Cl.
CPC ...... *G02F 1/1339* (2013.01); *G02F 1/133345* (2013.01); *G02F 1/136204* (2013.01); *G02F 1/1337* (2013.01); *G02F 2001/133388* (2013.01); *G02F 2001/136218* (2013.01); *G02F 2202/22* (2013.01)

(58) Field of Classification Search
CPC .................. G02F 1/1339; G02F 1/1337; G02F 1/136204; G02F 2001/136218; G02F 2202/22; G02F 2001/133388; G02F 1/133345

See application file for complete search history.

(56) References Cited

U.S. PATENT DOCUMENTS

| | | | | |
|---|---|---|---|---|
| 2007/0146598 A1* | 6/2007 | Yokokawa | ............ | G02F 1/1337 349/123 |
| 2012/0086878 A1* | 4/2012 | Mochiku | ............... | G02F 1/1339 349/5 |
| 2012/0099067 A1* | 4/2012 | Hara | ................. | G02F 1/136277 349/139 |

(Continued)

FOREIGN PATENT DOCUMENTS

| | | |
|---|---|---|
| JP | 10-206871 | 8/1998 |
| JP | 2012-189856 | 10/2012 |

*Primary Examiner* — Jia Pan  
(74) *Attorney, Agent, or Firm* — Oblon, McClelland, Maier & Neustadt, L.L.P.

(57) ABSTRACT

A liquid crystal display device prevents an alignment film between an inorganic insulating film and a sealant from peeling off the inorganic insulating film in a seal portion. The device has a TFT substrate and a counter substrate bonded together by the sealant in the seal portion with liquid crystal sandwiched therebetween. The TFT substrate has pixels in a matrix pattern along with the alignment film, and the TFT substrate and the counter substrate are rectangular in external shape. The TFT substrate has a display area and a terminal area. The display area is formed surrounded by the sealant. The counter substrate is absent over the terminal area. The alignment film is disposed under the sealant on the TFT substrate. An oxide conductive film, disposed under the alignment film, is formed up to the edge of the TFT substrate and is in an electrically floating state.

16 Claims, 13 Drawing Sheets

(56) References Cited

U.S. PATENT DOCUMENTS

| | | | | |
|---|---|---|---|---|
| 2012/0242914 A1* | 9/2012 | Hara | .................... | G02F 1/1333 |
| | | | | 349/5 |
| 2012/0249896 A1* | 10/2012 | Yokota | .............. | G02F 1/134336 |
| | | | | 349/5 |
| 2012/0249919 A1* | 10/2012 | Yokota | .............. | G02F 1/133345 |
| | | | | 349/61 |
| 2013/0076994 A1* | 3/2013 | Kawaura | ............... | G02F 1/1345 |
| | | | | 349/5 |
| 2015/0301370 A1* | 10/2015 | Moriwaki | ............. | G02F 1/1339 |
| | | | | 349/42 |

* cited by examiner

LIQUID CRYSTAL DISPLAY DEVICE

CLAIM OF PRIORITY

The present application claims priority from Japanese Patent Application JP 2015-121703 filed on Jun. 17, 2015, the content of which is hereby incorporated by reference into this application.

BACKGROUND OF THE INVENTION

1. Field of the Invention

The present invention relates to a display device. More particularly, the invention relates to a liquid crystal display device that ensures the reliability of its seal portion when serving as a narrow frame display device.

2. Description of the Related Art

Liquid crystal display devices are generally configured to have a thin-film transistor (TFT) substrate disposed opposite to a counter substrate with liquid crystal sandwiched therebetween, the TFT substrate typically having pixel electrodes and TFTs formed thereon in a matrix pattern. The display device forms an image by suitably controlling the light transmission factor of liquid crystal molecules for each pixel.

There is a strong need for medium-sized and small-sized liquid crystal display panels to maximize their display area while keeping their external shape small. This requires reducing the width between the edge of the display area and that of the liquid crystal display panel, thereby constituting what is known as a narrow frame display panel. The narrow frame display panel is characterized by a narrowed sealing width of the sealant that bonds the TFT substrate and the counter substrate together. This structure can entail problems with the adhesive strength of the seal portion.

Alignment films for initially orienting the liquid crystal are formed on those surfaces of the TFT substrate and the counter substrate which come into contact with the liquid crystal. Heretofore, the alignment films have not been formed over the seal portion so as to improve the reliability of its adhesive strength. However, narrow frame display devices make it difficult to keep the alignment films off the seal portion. To consider the reliability of the seal portion in terms of adhesive strength thus requires studying the adhesive strength between the sealant and the alignment films as well as the adhesive strength between the alignment films and their base films.

Japanese Unexamined Patent Application Publication No. 2012-189856 discloses a structure in which indium tin oxide (ITO) is disposed on wire-formed concave portions of the display area so that the alignment films over the concaves will not be rubbed off. The structure is intended to improve the adhesive strength of the alignment films. Japanese Unexamined Patent Application Publication No. Hei 10(1998)-206871 discloses a structure in which ITO-formed wires are passed under the seal portion to extend over the terminal area. The disclosure does not mention where the alignment films are to be applied.

SUMMARY OF THE INVENTION

In the past, the reliability of the seal portion has attracted attention only in terms of the adhesive strength between the sealant and the alignment film. But with the adhesive strength between the sealant and the alignment film improved, what matters is the bonding between the alignment film and its base film. There was assumed to be a sufficient adhesive strength between the alignment film and its base film. However, with more and more liquid crystal display devices configured to have narrower frames, the adhesive strength between the alignment film and its base film has become a problem.

The base film for the alignment film over the TFT substrate is different from the base film over the counter substrate. In many cases, the counter substrate has an organic film called an overcoat film used as the base film, while the TFT substrate has an inorganic film such as a silicon nitride (SiNx) film used as the base film. The alignment films are organic films made of polyimide resin, for example. Generally, there is a high adhesive strength between the organic films whereas there is a relatively low adhesive strength between the organic and the inorganic films. That means the adhesive strength between the alignment film and its base film has become problematic on the side of the TFT substrate.

It is therefore an object of the present invention to provide a liquid crystal display device that improves the adhesive strength between an alignment film and its base film to ensure the reliability of the seal portion when serving as a narrow frame display device.

The present invention proposes achieving the above object using the typical means outlined as follows: A liquid crystal display device is provided to have a TFT substrate and a counter substrate bonded together by a sealant in a seal portion with liquid crystal sandwiched therebetween, the TFT substrate having pixels in a matrix pattern along with an alignment film and being rectangular in external shape. The TFT substrate has a display area and a terminal area. The display area is formed surrounded by the sealant. The counter substrate is absent over the terminal area. The alignment film is disposed under the sealant on the TFT substrate. An oxide conductive film, disposed under the alignment film, is formed up to the edge of the TFT substrate and is in an electrically floating state.

BRIEF DESCRIPTION OF THE DRAWINGS

Further objects and advantages of the present invention will become apparent upon a reading of the following description and appended drawings in which.

DESCRIPTION OF THE PREFERRED EMBODIMENTS

The present invention is described below in detail using preferred embodiments.

First Embodiment

Figure 1:
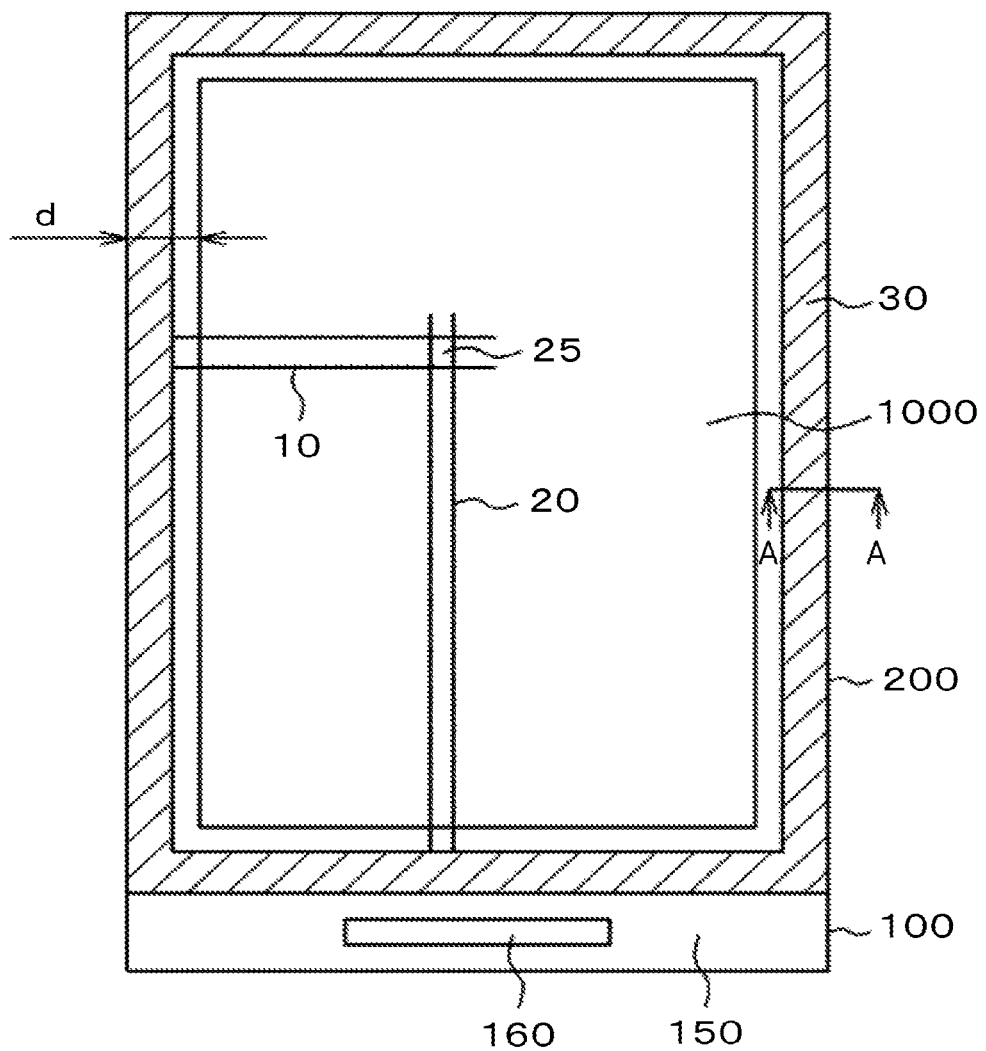
FIG. 1 is a plan view of a liquid crystal display device to which the present invention is adapted.

FIG. 1 is a plan view of a liquid crystal display panel to which the present invention is adapted. In FIG. 1, a TFT substrate 100 and a counter substrate 200 are bonded together by a sealant 30, the two substrates having liquid crystal sandwiched therebetween. The TFT substrate 100 is formed to be larger than the counter substrate 200. That portion of the TFT substrate 100 which is not covered with the counter substrate 200 constitutes a terminal area 150. Formed in the terminal area 150 are, for example, an integrated circuit (IC) driver 160 for driving the liquid crystal display panel and terminals for connecting a flexible wiring substrate that supplies power, video signal, and scanning signal to the liquid crystal display panel.

Over a display area 1000 in FIG. 1, scanning lines 10 extend in a crosswise direction and are arrayed in a longitudinal direction. Video signal lines 20 extend in the longitudinal direction and are arrayed in the crosswise direction. The portions enclosed by the scanning lines 10 and the video signal lines 20 constitute pixels 25. With the narrow frame display panel, the distance d between the edge of the display area 1000 and the edge of the liquid crystal display device is as small as about 1 mm. In this case, the available adhesion width of the sealant 30 is as narrow as about 0.4 mm. That means the adhesive strength of the seal portion is critically important.

What matters with the liquid crystal display device is its viewing angle characteristics. So-called the in-plane switching (IPS) system involves controlling the transmission factor of liquid crystal molecules by rotating them in parallel with the principal surface of the TFT substrate, thereby offering a good viewing angle characteristic. The present invention is described hereunder in conjunction with an IPS liquid crystal display device. However, this invention is not limited to IPS liquid crystal display devices; it can also be applied to other types of liquid crystal display devices including organic electroluminescent (EL) display devices.

In the case of the IPS system, the pixels are constituted by a structure in which second electrodes formed flat using transparent electrodes typically made of ITO are covered by comb-tooth-shaped or slit-formed first electrodes formed of transparent electrodes typically made of ITO, with an interlayer insulating film interposed therebetween. A voltage representing the video signal is impressed between the first and the second electrodes to drive the liquid crystal display device. Each pixel is formed of a thin-film transistor (TFT), a first electrode, and a second electrode, for example. In this specification, the ITO constituting the first electrodes will be referred to as the first ITO, and the ITO forming the second electrodes will be referred to as the second ITO. The first electrode may be a pixel electrode and the second electrode may be a common electrode, or vice versa.

Figure 2:
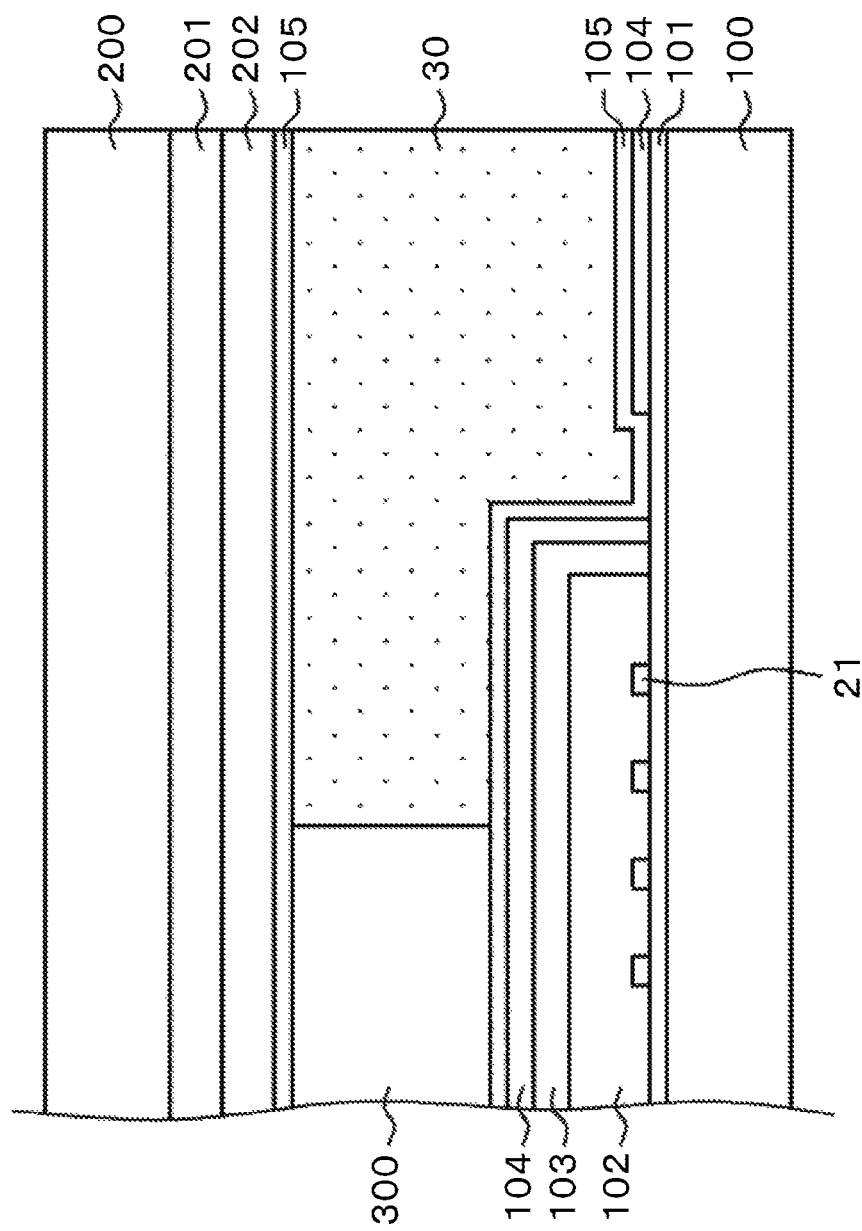
FIG. 2 is a cross-sectional view taken on line A-A in FIG. 1.

FIG. 2 is a detailed cross-sectional view of a seal portion taken on line A-A in FIG. 1. The cross-sectional shape of the seal portion is different from that of the display area. Of the layers making up the display area, those unnecessary for the seal portion are not shown. In FIG. 2, a first insulating film 101 is formed on a glass-formed TFT substrate 100. The first insulating film 101 may be an interlayer insulating film providing insulation between the scanning lines and the video signal lines, or may be a gate insulating film.

Lead wires 21 for the signal lines are formed on the first insulating film 101. The lead wires 21 extend from the upper side in FIG. 1 toward its lower side but are not shown in FIG. 1. An organic passivation film 102 is formed to cover the lead wires 21. The organic passivation film 102 is formed as thick as about 2 μm to play the role of a planarizing film. An interlayer insulating film 103 is formed typically by chemical vapor deposition (CVD) on the organic passivation film 102. The interlayer insulating film 103 is intended to provide insulation between the first and the second electrodes in the display area. The first ITO 104 is formed to cover the interlayer insulating film 103.

At the edge of the TFT substrate 100 in FIG. 2, the first ITO 104 is formed on the first insulating film 101. An alignment film 105 is formed to cover the first ITO 104. One feature of the present invention is that the ITO 104 is formed under the alignment film 105. The interlayer insulating film 103 is formed of silicon nitride (SiNx). The first insulating film 101 is often constituted by SiNx as well but is sometimes made of silicon dioxide ($SiO_2$). Since SiNx and $SiO_2$ have similar properties, SiNx will be explained in the ensuing paragraphs as representative of the insulating film materials. The adhesive strength between SiNx and the alignment film is not very high. On the other hand, the adhesive strength between the alignment film and the ITO is high, which is taken advantage of by the present invention for improving the reliability of the seal portion.

The first ITO 104 is in an electrically floating state. The outer first ITO 104, formed up to the edge of the TFT substrate 100, is vulnerable to the invasion of static electricity from the edge. However, the outer first ITO 104 is separated from the inner first ITO 104 at the edge of the organic passivation film 102. This structure prevents externally applied static electricity from reaching the inner first ITO 104 or the wires inside.

In FIG. 2, a counter substrate 200 is disposed opposite to the TFT substrate 100. A color filter layer 201 is formed on the counter substrate 200. An overcoat film 202 is formed on the color filter layer 201 (on the side of the TFT substrate). The alignment film 105 is formed on the overcoat film 202. Depending on the product type, the color filter layer 201 may be formed on the side of the TFT substrate 100. The TFT substrate 100 and the counter substrate 200 are bonded together by the sealant 30 that seals liquid crystal 300 inside.

The sealant 30 is bonded to the alignment films 105 on both sides of the TFT substrate 100 and the counter substrate 200. In particular, the adhesive strength of the alignment film 105 becomes a problem relative to the SiNx film 104 on the side of the TFT substrate 100. In the seal portion on the side of the TFT substrate 100 of this embodiment, the alignment film 105 is mostly bonded to the ITO 104. That means the seal portion is highly reliable.

Figure 3:
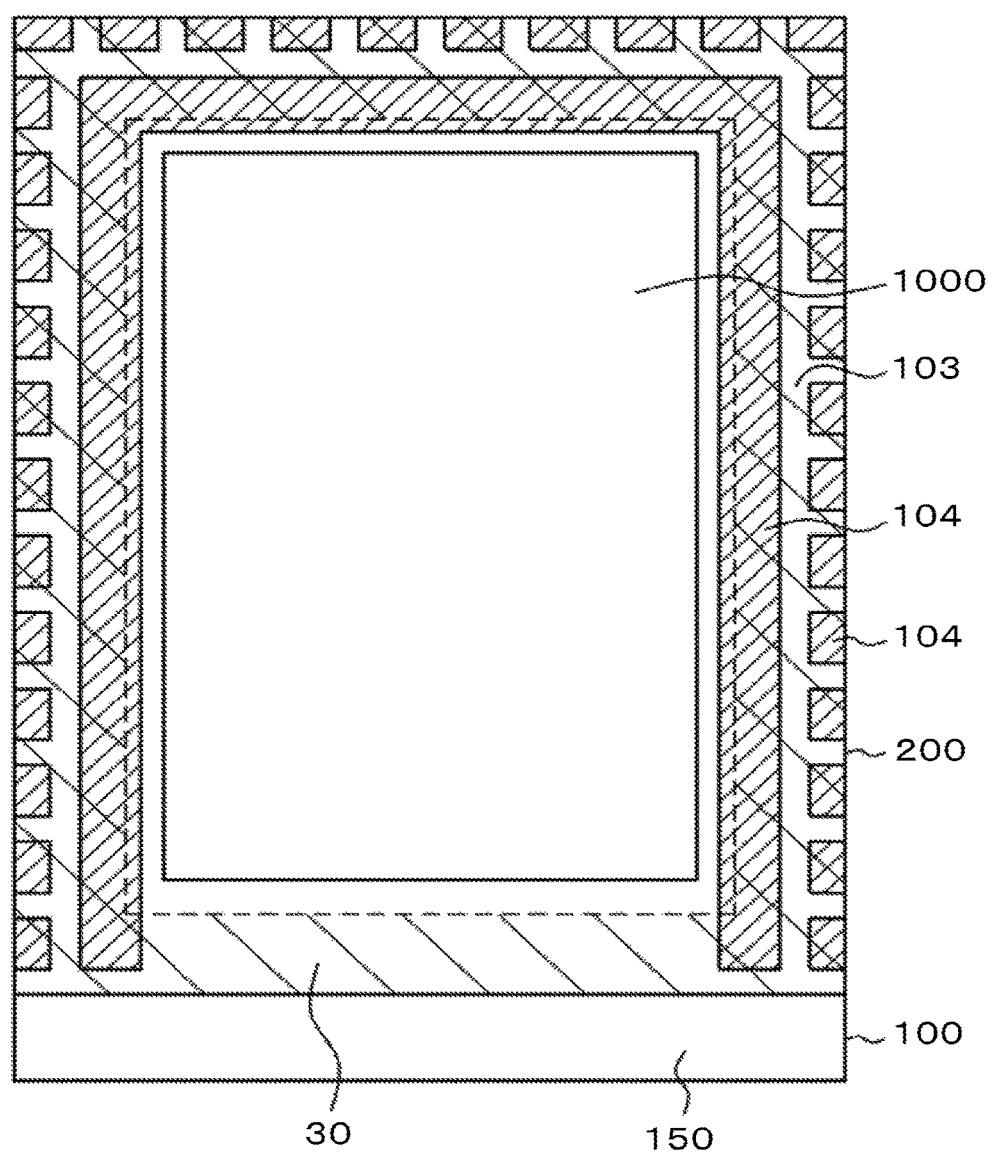
FIG. 3 is a schematic plan view showing an example of the range in which ITO is formed according to the present invention.

FIG. 3 is a schematic plan view showing a range in which the first ITO 104 is formed and a range in which the sealant 30 is formed on the side of the TFT substrate 100. In FIG. 3, the alignment film is formed all over the TFT substrate 100. Also in FIG. 3, the outer first ITO 104 is formed as islands along the TFT substrate edge, and the inner first ITO 104 is further formed across a gap. The outer first ITO 104 and the inner first ITO 104 in FIG. 3 are both in an electrically floating state. Alternatively, the inner first ITO 104 may be supplied with other voltages such as a common voltage (Vcom) and power. The outer first ITO 104 is electrically insulated from the inner first ITO 104.

The sealant 30 is disposed in a region shown hatched from the edge of the TFT substrate 100 or counter substrate 200 to broken lines. As shown in FIG. 3, on the side of the TFT substrate 100, the sealant 30 in most of its region overlaps with the first ITO 104. The first ITO, it should be noted, is not formed under the alignment film on the side of terminal area 150. That is because highly concentrated wiring over the terminal area 150 is highly vulnerable to the effects of static electricity coming through the first ITO 104. However, the side of the terminal area 150 has a more usable space than the other sides. This allows the width of the sealant 30 on the side of the terminal area 150 to be greater than on the other sides. To the extent that the adhesive area is widened, the adhesive strength is increased to that extent.

Figure 4:
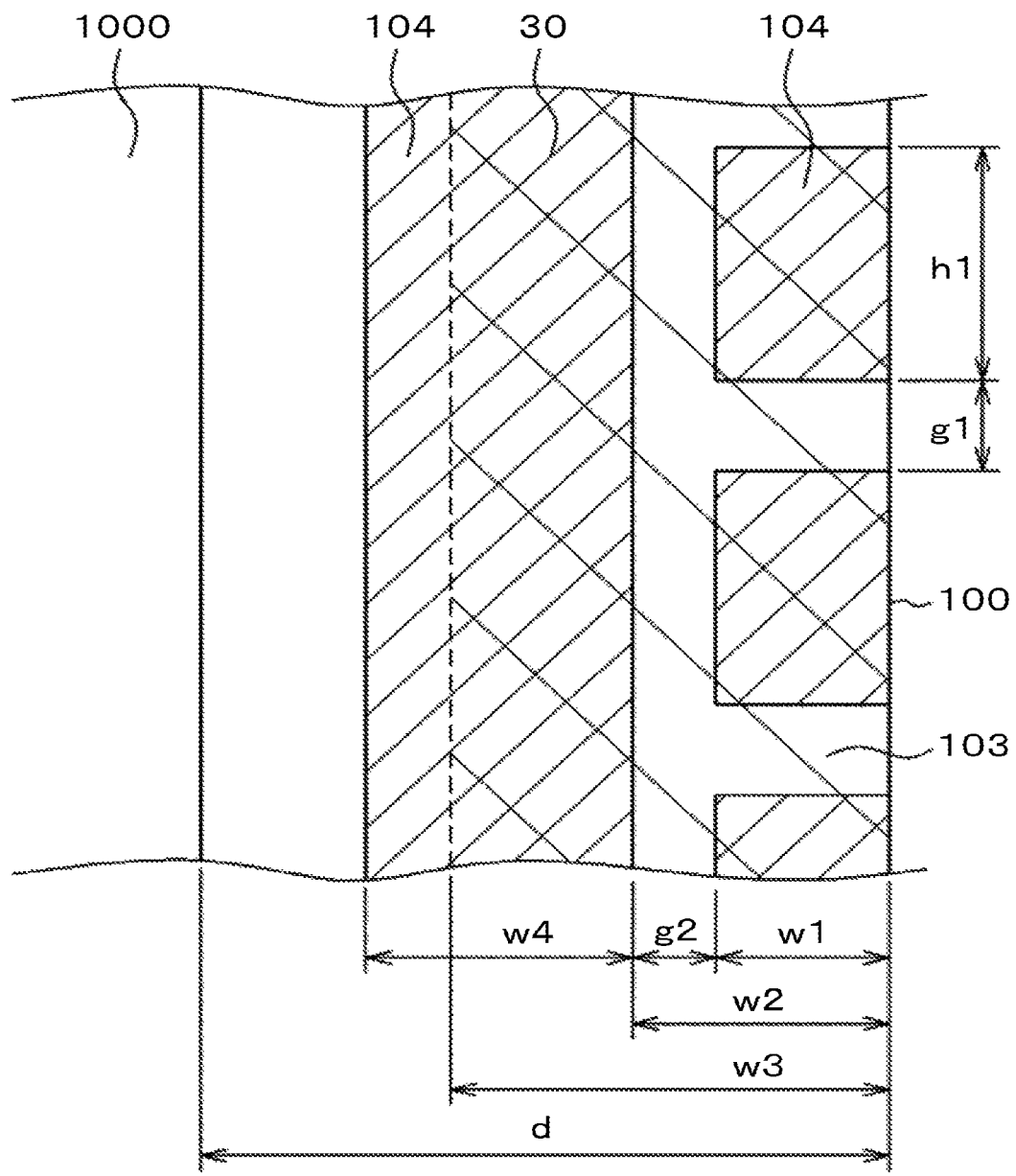
FIG. 4 is a magnified plan view of a structure according to the present invention.

FIG. 4 is a magnified plan view showing dimensional relations among the first ITO 104, sealant 30, and other parts in the seal portion on the long side or the short side in FIG. 3. In FIG. 4, the sealant 30 is formed to a width of w3 from the edge of the TFT substrate 100. The first ITO islands 104 are formed to a width of w1 from the edge of the TFT substrate 100. The inner first ITO 104 is formed to a width of w4 inwardly from the distance of w2 away from the edge of the TFT substrate 100, the inner first ITO 104 extending in stripes in the side direction of the TFT substrate 100. In FIG. 4, the edge of the inner first ITO 104 is formed further toward the display area 1000 from the inner edge of the sealant 30. Since the object of the first ITO 104 is to improve the adhesive strength of the seal portion, the inner edge of the inner first ITO 104 may be positioned the same as the inner edge of the sealant 30. If adhesiveness is not significantly affected, the inner edge of the inner first ITO 104 may be located outside the inner edge of the sealant 30, i.e., approximately in the middle of the sealant 30.

A gap of g2 is provided between the outer first ITO 104 and the inner first ITO 104. The gap g2 prevents externally applied static electricity from flowing into the inner first ITO 104. Each outer ITO island 104 has a length of h1 along the side of the TFT substrate 100. A gap of g1 is provided between two adjacent first ITO islands 104. Where there is no inner or outer first ITO 104, the sealant 30 is in contact with the interlayer insulating film 103 (i.e., SiNx). The gap g1 is preferably as small as possible in order to improve the adhesive strength of the alignment film.

Typical dimensions are as follows: The width w1 and the length h1 determining the size of each outer first ITO island 104 are 100 μm and 150 μm, respectively. The gap between two adjacent first ITO islands is 5 μm or more, preferably 10 μm or more and 50 μm or less. The gap g2 between the outer first ITO islands 104 and the inner first ITO 104 in stripes is also 5 μm or more, preferably 10 μm or more and 50 μm or less. The lower limit of the gaps g1 and g2 is designed to prevent static electricity from reaching the other regions; the upper limit of the gaps g1 and g2 is designed to maximize the area in which the alignment film is in contact with the first ITO.

In FIG. 4, the width w3 of the sealant 30 is 400 μm. The inner first ITO 104 is formed to the width w4 inwardly from the position of w2=w1+g2. The gap w2 is typically 150 μm. The first ITO islands 104, formed at the edge of the TFT substrate 100, are vulnerable to the invasion of static electricity. This requires limiting the width w1. For example, the width (w1) of the outer first ITO islands 104 divided by the width (w3) of the sealant 30 is preferably 35% or less. In view of adhesive strength, the ratio of the gap g2 between the outer first ITO 104 and the inner first ITO 104 to the width w3 of the sealant 30 is preferably 15% or less.

Figure 5:
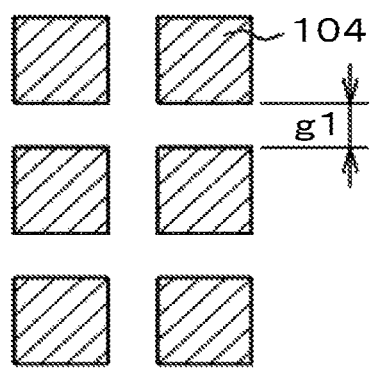
FIG. 5 is a plan view showing typical ITO islands.
Figure 6:
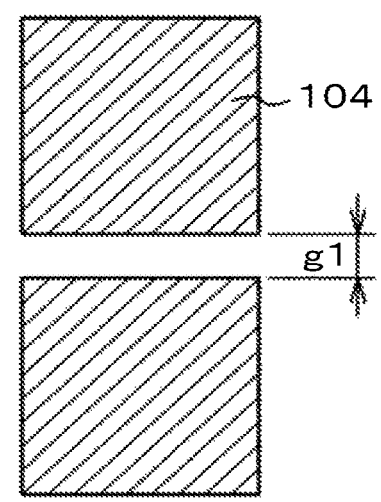
FIG. 6 is a plan view showing other typical ITO islands.

The shape of the outer first ITO 104 is not limited to what is shown in FIG. 3 or 4. FIGS. 5 and 6 show other typical shapes of the outer first ITO 104. FIG. 5 shows the outer first ITO 104 formed as small tiles, and FIG. 6 shows the outer first ITO 104 formed as large tiles. The shape in FIG. 5 limits the effects of invading static electricity to small regions. However, the adhesive strength drops because of an increased proportion of the area where the interlayer insulating film 103 is exposed under the first ITO 104. On the other hand, the shape in FIG. 6 is more vulnerable to the effects of invading static electricity than the shape in FIG. 5 but offers higher adhesive strength because of a reduced proportion of the area where the interlayer insulating film 103 is exposed. Although the inner first ITO 104 is shown as one stripe in FIG. 4, there may be two or more stripes of the inner first ITO 104. As another alternative, the stripes may be omitted. It is also possible to form a part of the inner first ITO 104 narrower than another part thereof on the substrate, the latter part being formed alternatively as a number of stripes. If a plurality of stripes of the inner first ITO 104 are to be provided, the outermost stripe closest to the substrate periphery may be left in an electrically floating state while the other stripes of the inner first ITO 104 may be supplied with a predetermined potential such as a common voltage.

In FIG. 5, two columns of the first ITO islands 104 are formed in the longitudinal direction. Alternatively, three or more columns may be formed. As another alternative, the first ITO islands 104 may be formed not in a matrix pattern but in a staggered pattern (each column staggered relative to an adjacent column). It is also possible to form the outermost islands closest to the substrate edge with a size different from that of the inner islands. In order to maximize the proportion of the area of the first ITO 104 in the seal portion while maintaining the insulation between the first ITO islands 104, it is reasonable to form the first ITO islands 104 in the shape of tiles.

The outer first ITO islands 104 need not have the same shape along all sides of the TFT substrate 100. Because the corners of the liquid crystal display panel are subject to high peeling stress, the first ITO islands 104 at the corners may be shaped as shown in FIG. 6. The first ITO islands 104 along the panel sides (i.e., between the corners) may be shaped as shown in FIG. 5 to better provide against invading static electricity.

Figure 7:
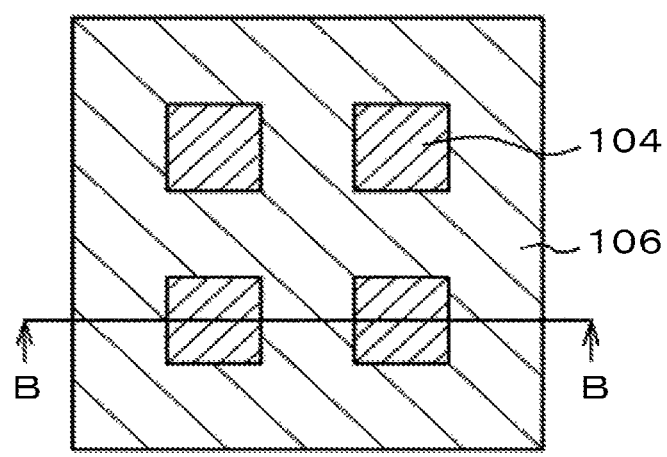
FIG. 7 is a plan view showing an example in which two ITO layers are used.
Figure 8:
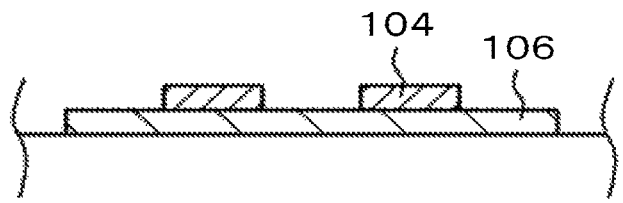
FIG. 8 is a cross-sectional view taken on line B-B in FIG. 7.

It has been explained above that only the first ITO 104 is provided as the ITO. As explained earlier, the IPS liquid crystal display device has the first electrodes using the first ITO and the second electrodes using the second ITO on the TFT substrate 100. That means both the first ITO and the second ITO may be used to improve the adhesive strength of the alignment film in the seal portion. FIG. 7 is a plan view showing the case where both the first ITO 104 and the second ITO 106 are used as the outer ITO in FIG. 3. FIG. 8 is a cross-sectional view taken on line B-B in FIG. 7. In FIGS. 7 and 8, the second ITO 106 is shown formed as large tiles and the first ITO 104 as small tiles. This structure makes the surface of the ITO film uneven, further improving the adhesive strength between the alignment film and the ITO. In this case, the first ITO islands are electrically interconnected via the second ITO 106. Alternatively, slits may be provided in the second ITO 106 between the first ITO islands. This structure contributes to preventing the invasion of externally applied static electricity. It is also possible to leave insulating film islands between the first ITO and the second ITO.

Figure 9:
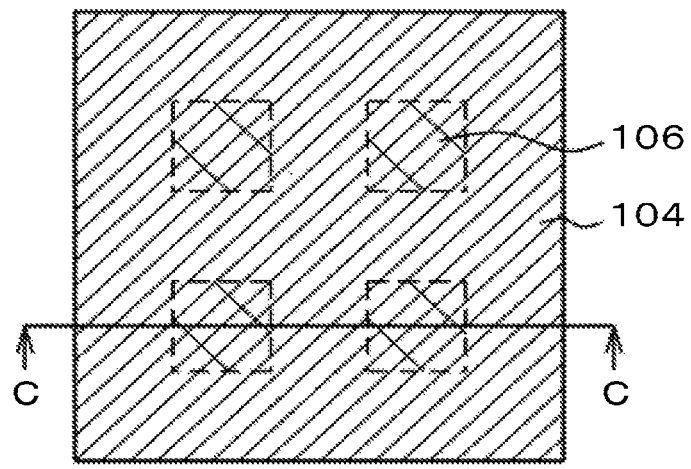
FIG. 9 is a plan view showing another example in which two ITO layers are used.
Figure 10:
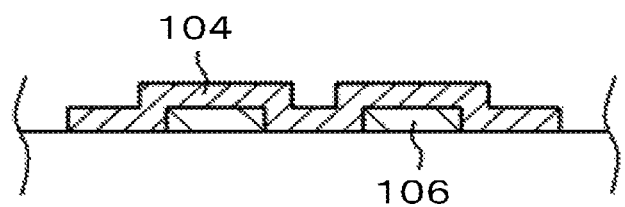
FIG. 10 is a cross-sectional view taken on line C-C in FIG. 9.

FIGS. 9 and 10 show another example in which both the first ITO 104 and the second ITO 106 are used. FIG. 9 is a plan view showing the second ITO 106 formed as small tiles and the first ITO 104 as large tiles. FIG. 10 is a cross-sectional view taken on line C-C in FIG. 9. The effects of the structure in FIGS. 9 and 10 are the same as those explained above in conjunction with the structure in FIGS. 7 and 8. In this case, too, slits may be provided in the first ITO 104, or insulating film islands may be left to cover the second ITO islands.

Figure 11:
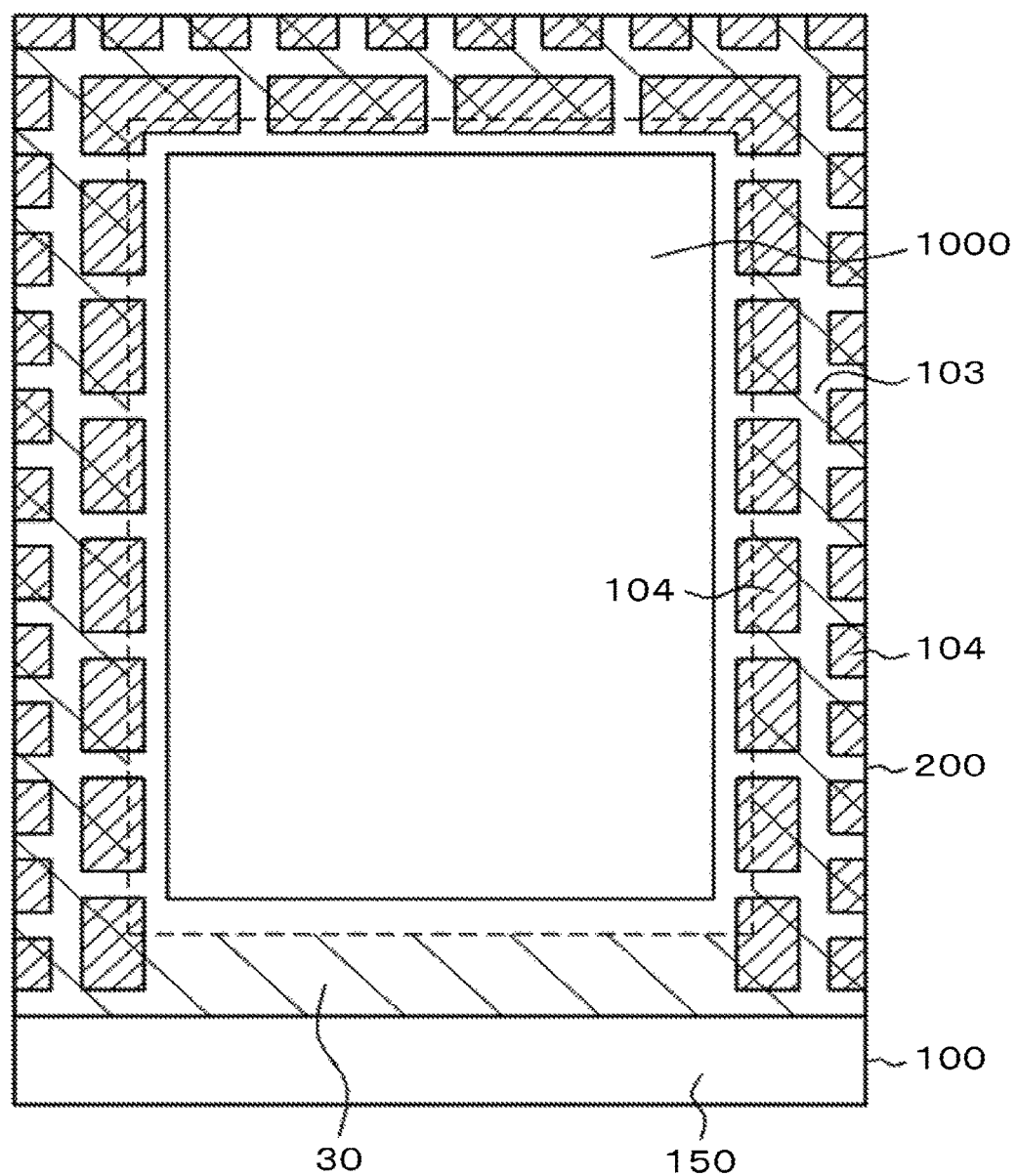
FIG. 11 is a schematic plan view showing another example of the range in which ITO is formed according to the present invention.

As explained above, the outer first ITO 104 is formed as islands, and the inner first ITO 104 is formed in stripes in parallel with the TFT substrate side. However, the inner first ITO 104 is not limited in shape to stripes and may be formed as islands, as shown in FIG. 11. Although FIG. 11 shows the inner first ITO islands 104 to be larger than the outer first ITO islands 104, the inner and the outer first ITO islands 104 may have substantially the same shape. As another alternative, the inner first ITO islands 104 may be formed to be smaller than the outer first ITO islands 104, as opposed to the arrangement shown in FIG. 11.

Second Embodiment

FIGS. 12 to 17 show various examples of the first ITO designed to improve the adhesive strength of the alignment films. In each of FIGS. 12 to 17, each first ITO island 104 is shown formed to a width of d between the TFT substrate edge and the display area edge shown in FIG. 1. However, these arrangements are only examples. As discussed above in conjunction with the first embodiment, a plurality of first ITO islands may be formed within the width d in FIG. 1.

Figure 12:
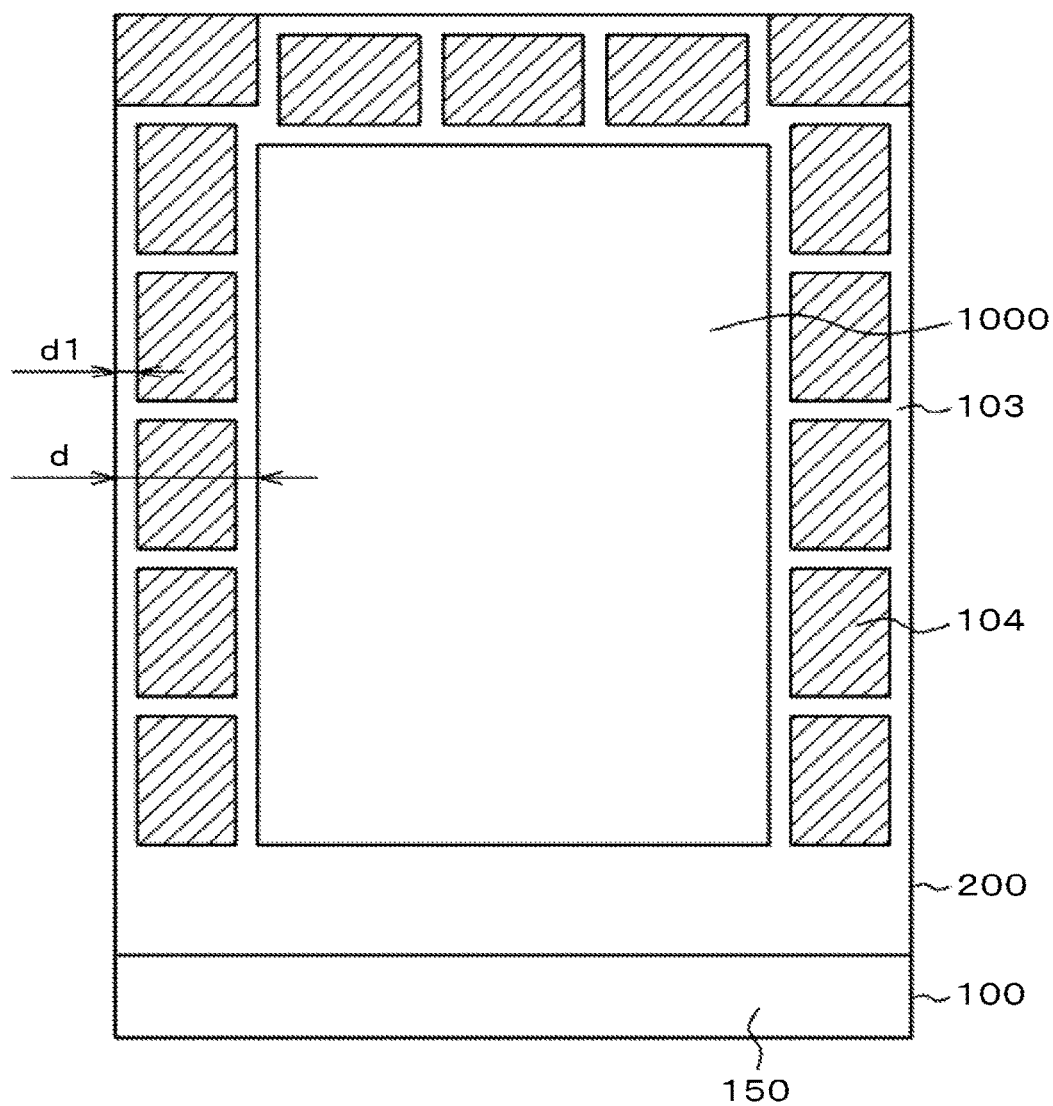
FIG. 12 is a schematic plan view showing an example of the range in which ITO is formed as part of a second embodiment of the present invention.

FIG. 12 shows an example in which the outer edge of the first ITO 104 along the sides of the TFT substrate 100 is located inwardly from the substrate edge by a predetermined distance of d1, and in which the first ITO 104 at the corners of the TFT substrate 100 is formed up to the substrate edge. The peeling stress between the TFT substrate 100 and the counter substrate 200 is greater at the corners of the liquid crystal display panel than at its sides. For this reason, the first ITO 104 at the panel corners is formed up to the edge of the TFT substrate 100. Along the panel sides, the first ITO 104 is positioned from the edge of the TFT substrate 100 by the distance d1 to better provide against invading static electricity. In FIG. 12, too, the first ITO 104 is not formed on the side of the terminal area 150 for the same reason discussed above in conjunction with the first embodiment. Although the first ITO 104 is shown distanced from the substrate edge on the three sides except for the bottom side in FIG. 12, the first ITO 104 may be allowed to extend up to the substrate edge on some side.

Figure 13:
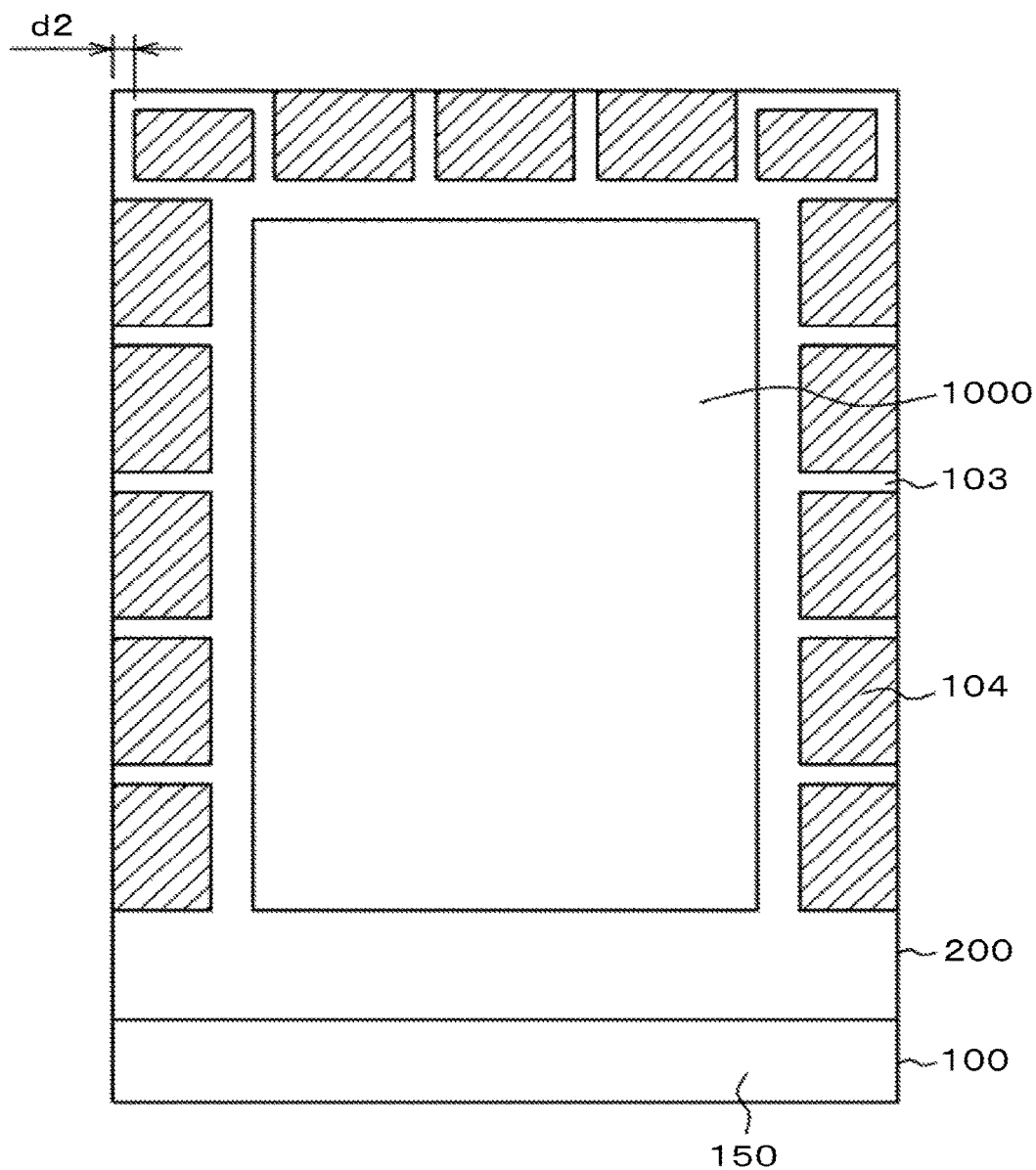
FIG. 13 is a schematic plan view showing another example of the range in which ITO is formed as part of the second embodiment.

As opposed to the structure shown in FIG. 12, the structure in FIG. 13 is an example in which the edge of the first ITO islands 104 at the corners of the TFT substrate 100 is located inwardly from the substrate edge by a predetermined distance d2, and in which the first ITO islands 104 along the side of the TFT substrate 100 are formed up to the substrate edge. This structure may be adopted when, at the corners, the first ITO 104 cannot be formed up to the corner edge of the TFT substrate 100 under layout constraints such as the presence of an alignment mark. In the structure of FIG. 13, the first ITO 104 along the sides is formed up to the edge of the TFT substrate 100 so as to ensure the adhesive strength necessary for the alignment film on the sides. In FIG. 13, the first ITO 104 is also not formed on the side of the terminal area 150.

Figure 14:
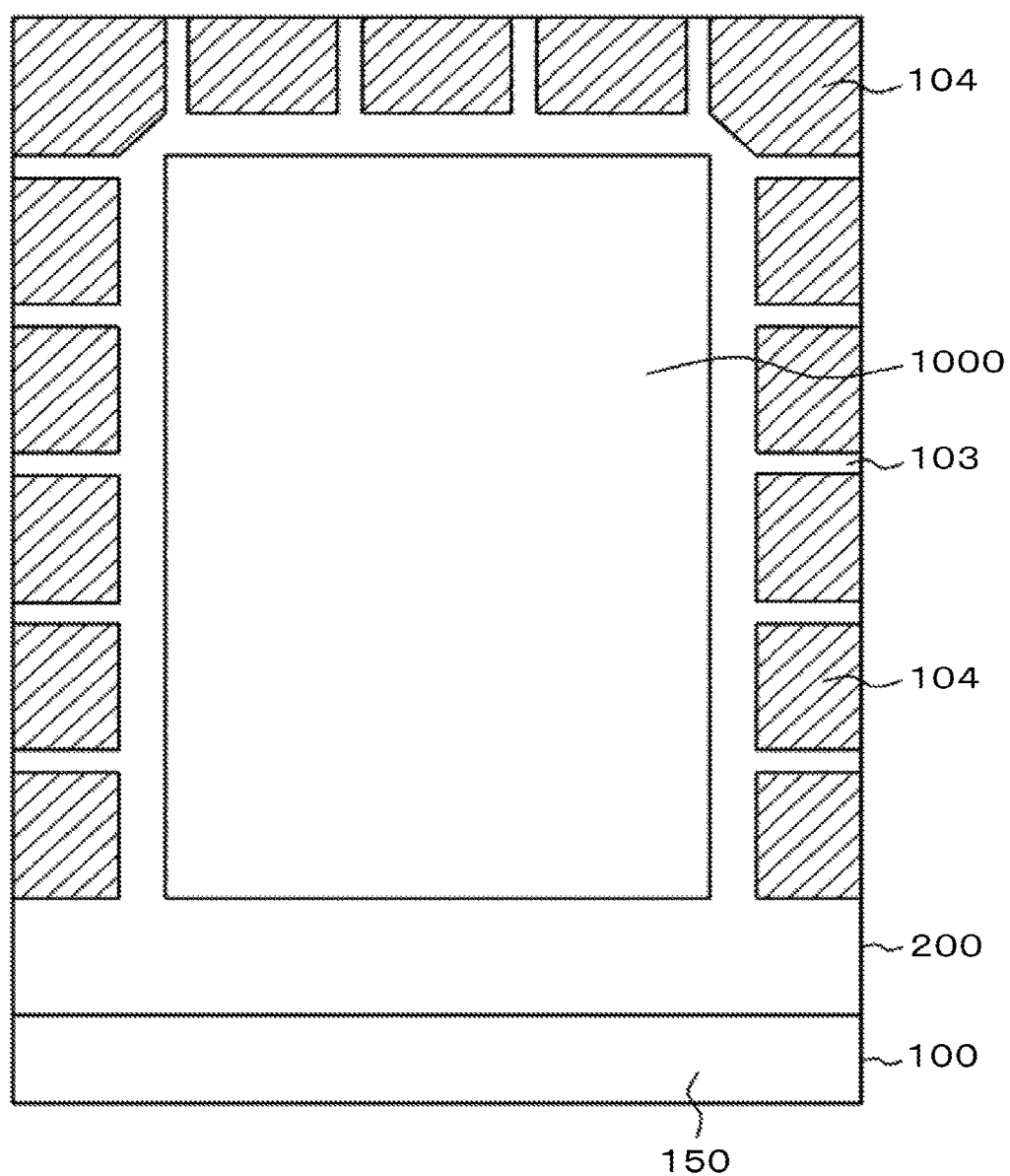
FIG. 14 is a schematic plan view showing still another example of the range in which ITO is formed as part of the second embodiment.

FIG. 14 shows an example in which the first ITO 104 both at the corners and on the sides is formed up to the edge of the TFT substrate 100, with the first ITO island 104 at each corner having its inward-pointing corner shaped as cut off. Where the lead wires at the corners are bent not at 90 degrees but at some other predetermined angle, the first ITO islands 104 may have their inward-pointing corners shaped as cut off to accommodate the wiring. This prevents the lead wires from overlapping with the first ITO islands 104.

Figure 15:
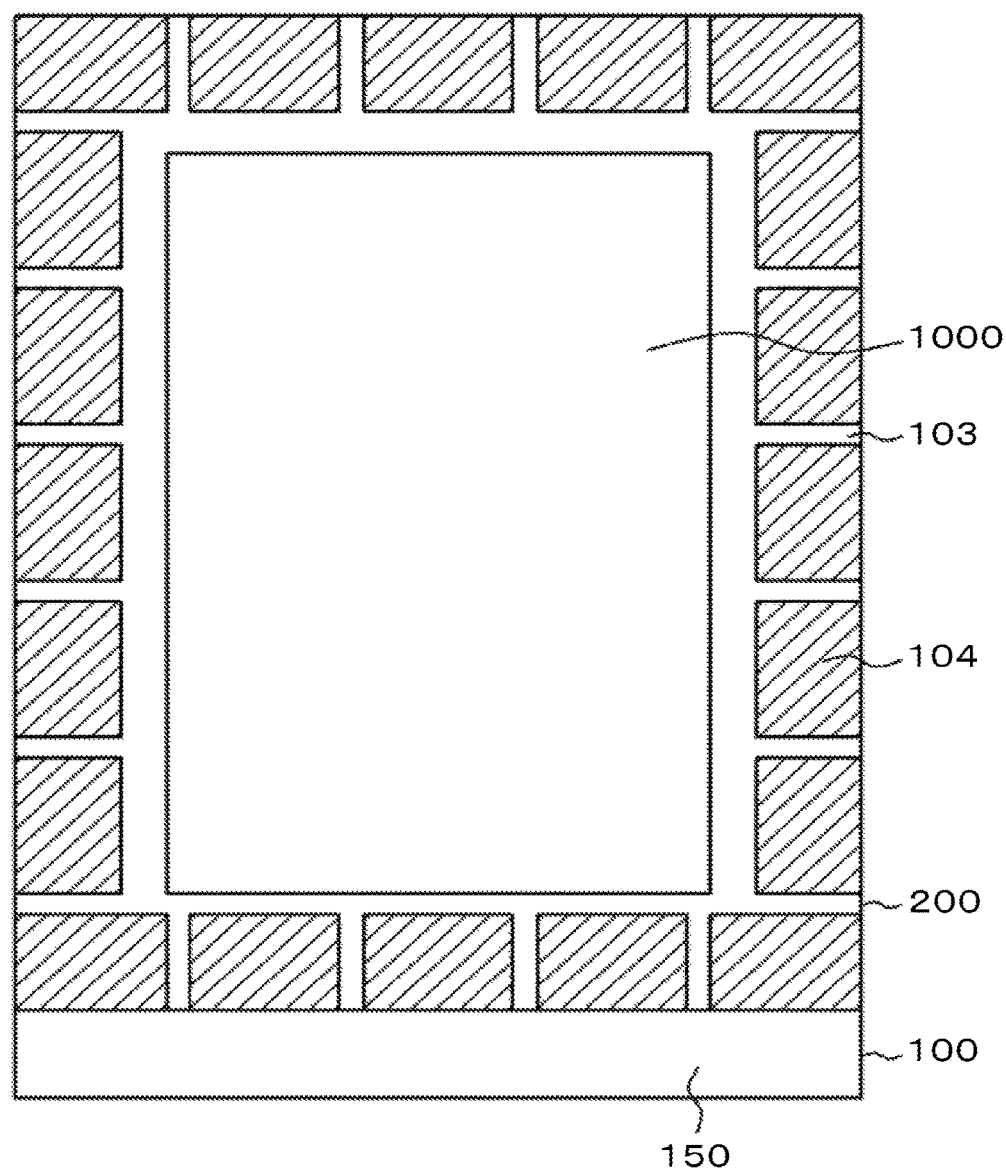
FIG. 15 is a schematic plan view showing still another example of the range in which ITO is formed as part of the second embodiment.

FIG. 15 shows an example in which the first ITO islands 104 are also formed on the side of the terminal area 150. In the foregoing embodiments, the first ITO 104 is not provided on the side of the terminal area 150. However, in some cases, the adhesive strength of the seal portion can become a problem on the side of the terminal area 150. In FIG. 15, the first ITO 104 is shown formed up to the edge of the TFT substrate 100 along the sides except for the side of the terminal area 150. Along the side of the terminal area 150, the first ITO 104 is formed up to the portion corresponding to the edge of the counter substrate 200.

On the side of the terminal area 150, the lead wires are highly concentrated. This requires providing sufficient countermeasures against static electricity. The countermeasures may include making the first ITO islands 104 smaller in size on the side of the terminal area 150 than on the other sides, and making the first ITO islands 104 different in shape on the side of the terminal area 150 from on the other sides. Another countermeasure may involve getting a thick organic passivation film to extend up to the outer edge of the seal portion on the terminal area side. This improves the resistance to static electricity.

Figure 16:
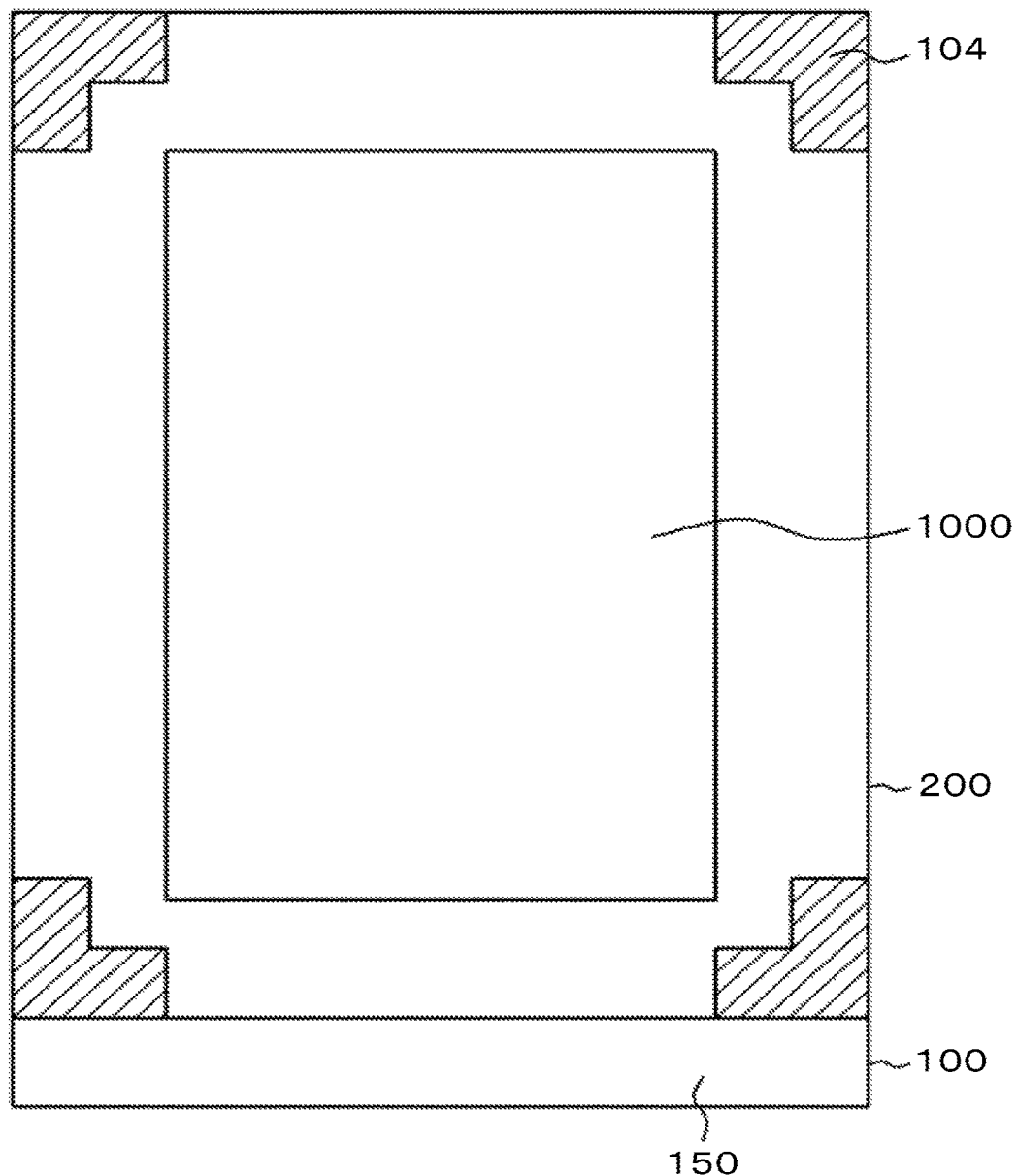
FIG. 16 is a schematic plan view showing still another example of the range in which ITO is formed as part of the second embodiment.

FIG. 16 shows an example in which the first ITO 104 is disposed under the alignment film only at the four corners of the seal portion where the counter substrate 200 and the TFT substrate 100 are bonded together. In this case, too, the first ITO 104 disposed under the alignment film is formed up to the edge of the TFT substrate 100. This is to counter the high peeling stress in the seal portion at the four corners. Meanwhile, there is no first ITO 104 on the sides of the liquid crystal display panel, so that the problem of static electricity can be bypassed over an extensive region along the sides.

Figure 17:
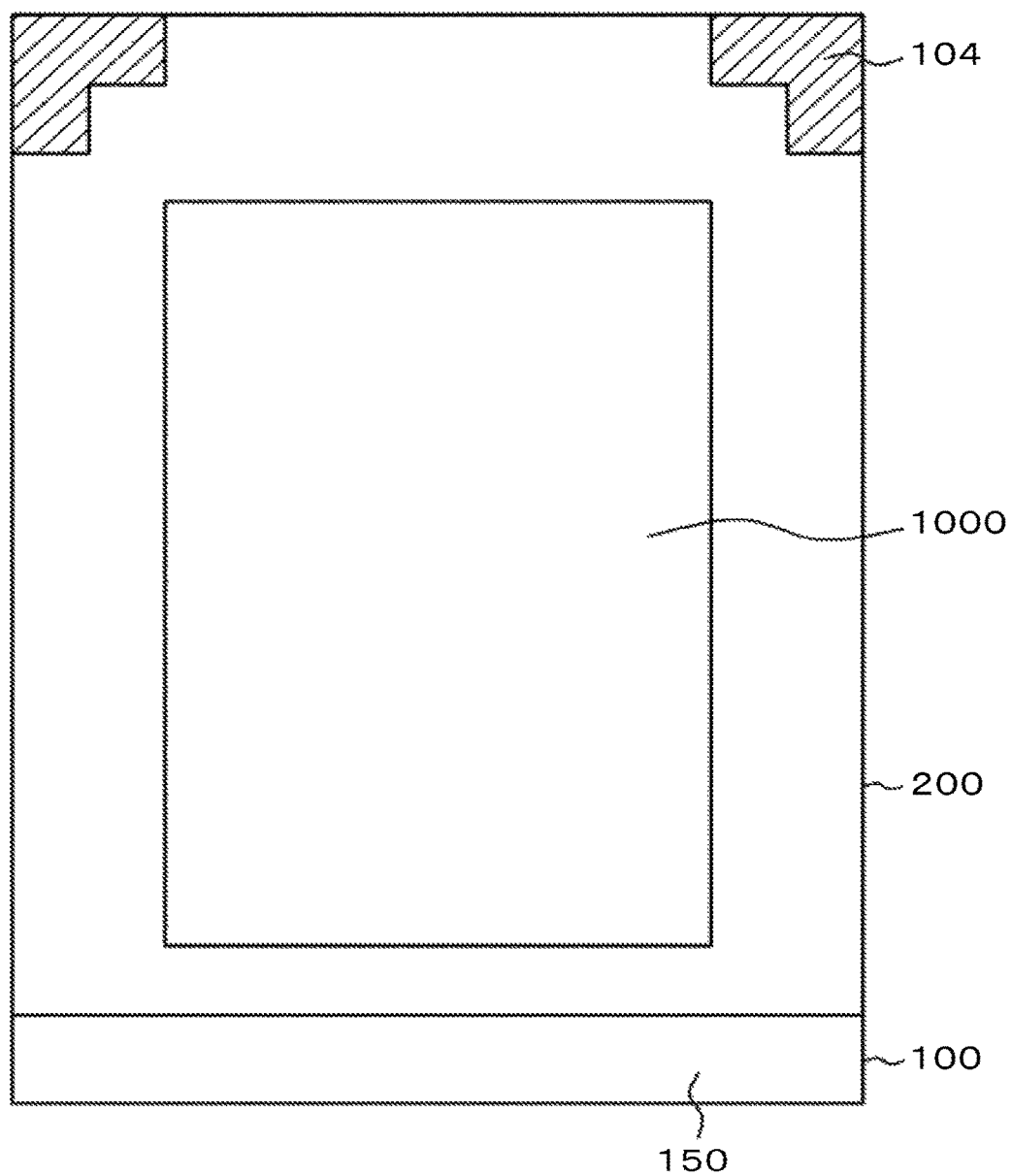
FIG. 17 is a schematic plan view showing still another example of the range in which ITO is formed as part of the second embodiment.

FIG. 17 shows an example in which the first ITO 104 is disposed under the alignment film only at the two corners distanced from the terminal area 150 in the seal portion where the counter substrate 200 and the TFT substrate 100 are bonded together. In this case, too, the first ITO 104 disposed under the alignment film is formed up to the edge of the TFT substrate 100. This is to counter the highest peeling stress in the seal portion at the two corners farthest from the terminal area 150. On the other hand, there is no first ITO 104 in the other portions including the sides of the liquid crystal display panel, so that the problem of static electricity can be bypassed over an extensive region in these portions.

The IPS system has no need for a pre-tilt angle. That means the so-called photo-alignment method is suitable for the IPS system to perform the aligning process on the alignment film. Photo-alignment involves irradiating liquid crystal macromolecules with polarized ultraviolet light to destroy their chains in a specific direction, thereby giving uniaxial anisotropy to the alignment film to let the alignment film exert its orientation characteristics accordingly. An alignment film undergoing the photo-aligning process has lower adhesiveness with the sealant or with the film under the alignment film than an alignment film undergoing some other aligning process. It follows that the present invention discussed above is particularly suitable for IPS liquid crystal display devices adopting the photo-aligning process. Adapting the present invention to these IPS liquid crystal display device subject to the photo-aligning process contributes to narrowing their panel frames and reinforcing the adhesive strength of their relevant portions. It has been explained above that ITO is used as the material for improving the adhesive strength of the alignment films. The explanation is based on the assumption that ITO constitutes the oxide conductive filmmaking up the first or the second electrodes. However, the oxide conductive film may be formed not only of ITO but also of indium zinc oxide (IZO), for example. If IZO or some other material is used as the first or the second electrodes in the pixels, then IZO or some other material may be used to form the oxide conductive film under the alignment film at the edge of the TFT substrate or the counter substrate.

The foregoing paragraphs have described the present invention primarily in conjunction with the IPS system. However, this invention can be adapted not only to the IPS system but also to vertical alignment (VA) or twisted nematic (TN) type liquid crystal display devices. The VA system uses liquid crystal that has a negative dielectric anisotropy. The VA system involves keeping the liquid crystal molecules oriented perpendicularly to the plane of the TFT substrate or the counter substrate in the absence of an electric field and having the liquid crystal molecules tilted in the presence of an electric field so as to control the transmission factor of the light passing through the liquid crystal layer. The TN system involves keeping the orientation of liquid crystal molecules initially twisted progressively at 90 degrees from the TFT substrate toward the counter substrate in the absence of an electric field and changing the orientation of the liquid crystal molecules from their initial orientation in the presence of an electric field. The amount of the change relative to the initial orientation is regulated in accordance with the intensity of the applied electric field, thereby controlling the transmission factor of the light passing through the liquid crystal layer.

In the case of the VA or TN system, for example, the pixel electrodes are formed using a transparent conductive film on the side of the TFT substrate and the common electrode is formed also using a transparent conductive film on the side of the counter substrate. That means the ITO may be formed under the alignment films up to the substrate edge on both sides of the TFT substrate and the counter substrate.

With the VA or TN system, the ITO at the edge on the side of the counter substrate is also formed under the alignment film. That is, in the structure shown in FIG. 2, the ITO is formed between the alignment film and the overcoat film. For this reason, the present invention can be applied not only to the ITO disposed on the side of the TFT substrate but also to the ITO disposed on the side of the counter substrate. Obviously, this invention can be applied to the ITO on the side of the TFT substrate and to the ITO on the side of the counter substrate at the same time.

What is claimed is:

1. A liquid crystal display device comprising a thin-film transistor (TFT) substrate having pixel electrodes and an alignment film, a counter substrate disposed opposite to the TFT substrate, and a sealant and liquid crystal sandwiched between the TFT substrate and the counter substrate;
   wherein the TFT substrate has a display area and a terminal area, the display area is surrounded by the sealant;
   wherein the alignment film is interposed between the sealant and the TFT substrate, an organic passivation film is interposed between the alignment film and the TFT substrate and overlaps with the sealant, and the organic passivation film is not formed up to an edge of the TFT substrate, an oxide conductive film is interposed between the alignment film and the TFT substrate, and the oxide conductive film is formed up to the edge of the TFT substrate; and
   wherein the oxide conductive film is in an electrically floating state.

2. The liquid crystal display device according to claim 1, wherein the oxide conductive film is formed in pieces along sides of the TFT substrate, the pieces being distanced from each other by a first distance and electrically isolated from each other.

3. The liquid crystal display device according to claim 2, wherein the first distance is 5 µm or more and 50 µm or less.

4. The liquid crystal display device according to claim 1, wherein the oxide conductive film is formed in pieces within a predetermined width perpendicular to each side of the TFT substrate, the pieces being electrically isolated from each other.

5. The liquid crystal display device according to claim 1, wherein the oxide conductive film is not formed under the sealant on a side of the terminal area.

6. The liquid crystal display device according to claim 1, wherein the oxide conductive film is formed up to the edge of the TFT substrate at the corners thereof distanced from the terminal area of the TFT substrate.

7. The liquid crystal display device according to claim 6, wherein, on the side of the terminal area of the TFT substrate, the oxide conductive film is formed up to the positions corresponding to the corners at the edge of the counter substrate.

8. The liquid crystal display device according to claim 1, wherein the oxide conductive film is formed as islands when viewed in a plan view, including islands along sides of the TFT substrate having a first island shape and islands at corners of the TFT substrate having a second island shape, the first island shape being different from the second island shape.

9. The liquid crystal display device according to claim 1, wherein the oxide conductive film has a dual layer structure formed of a first oxide conductive film and a second oxide conductive film.

10. The liquid crystal display device according to claim 9, wherein a planar shape of the first oxide conductive film is different from a planar shape of the second oxide conductive film.

11. The liquid crystal display device according to claim 1, wherein the liquid crystal display device is an in-plane switching (IPS) type.

12. The liquid crystal display device according to claim 1, wherein the counter substrate has a counter substrate-side alignment film disposed under the sealant and has a counter substrate-side oxide conductive film disposed under the counter substrate-side alignment film, the counter substrate-side oxide conductive film being formed up to an edge of the counter substrate; and wherein the counter substrate-side oxide conductive film is in an electrically floating state.

13. The liquid crystal display device according to claim 12, wherein the liquid crystal display device is a vertical alignment (VA) type.

14. The liquid crystal display device according to claim 12, wherein the liquid crystal display device is a twisted nematic (TN) type.

15. The liquid crystal display device according to claim 1, wherein the alignment film is subject to the process of photo-alignment.

16. The liquid crystal display device according to claim 1, wherein the oxide conductive film is made of indium tin oxide (ITO).

\* \* \* \* \*